United States Patent [19]

Laughlin

[11] 4,384,838
[45] May 24, 1983

[54] PIE CRUST CUTTING AND DECORATING APPARATUS

[76] Inventor: Etta J. Laughlin, #10 Deer Path, Salem, Ill. 62881

[21] Appl. No.: 285,745

[22] Filed: Jul. 22, 1981

Related U.S. Application Data

[63] Continuation of Ser. No. 121,327, Feb. 14, 1980, abandoned, which is a continuation-in-part of Ser. No. 874,241, Feb. 1, 1978, abandoned.

[51] Int. Cl.³ .................... A21C 11/10; A21C 11/12
[52] U.S. Cl. .................................. 425/299; 249/102; 249/103; 249/104
[58] Field of Search ............... 425/299; 249/102, 103, 249/104

[56] References Cited

U.S. PATENT DOCUMENTS

| 65,618 | 6/1867 | Treadwell | 425/299 |
| 619,749 | 2/1899 | Hooks | 425/299 |
| 824,445 | 6/1906 | Scott | 425/299 |
| 2,214,475 | 9/1940 | Napolillo | 425/299 |
| 2,431,789 | 12/1947 | Cosgrove | 425/299 |
| 3,534,440 | 10/1970 | Roberts | 249/103 |

Primary Examiner—James H. Derrington
Attorney, Agent, or Firm—Mawhinney & Mawhinney & Connors

[57] ABSTRACT

An apparatus for cutting out and simultaneously decoratively impressing a top crust for a filled pie from a rolled out sheet of dough having a flat annular sturdy plate with an upper side from the center of which a handle projects and with an underside from the circumference of which an annular cutting rim depends. Decorative die elements are removably provided on the underside of the plate within the area circumscribed by the cutting rim and form selected decorative depressions in the pie crust section as it is cut out from a rolled out sheet of dough with the depressions being later filled in with a food coloring filler after the cutout pie crust section is placed over the filling in a pie.

4 Claims, 5 Drawing Figures

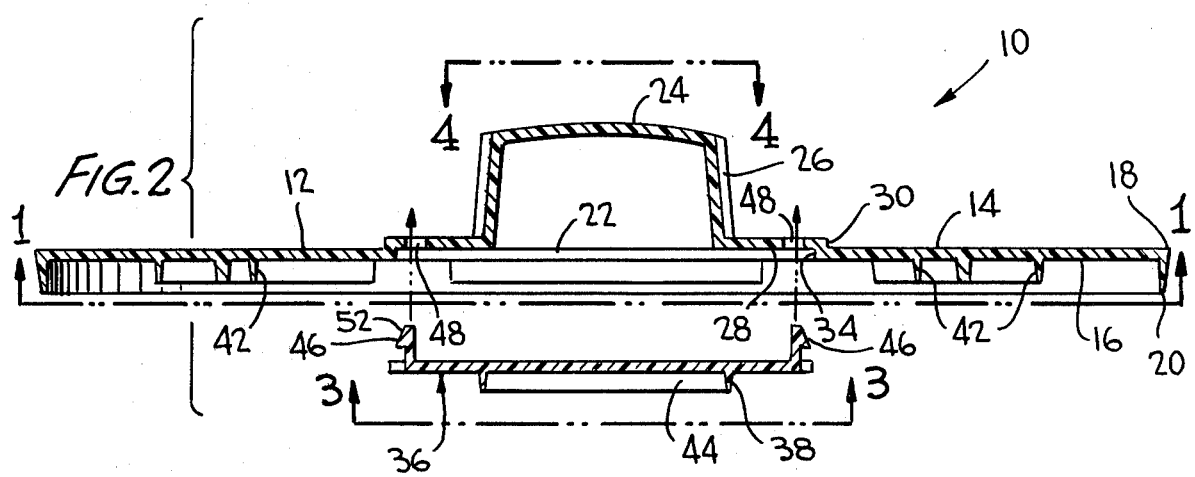
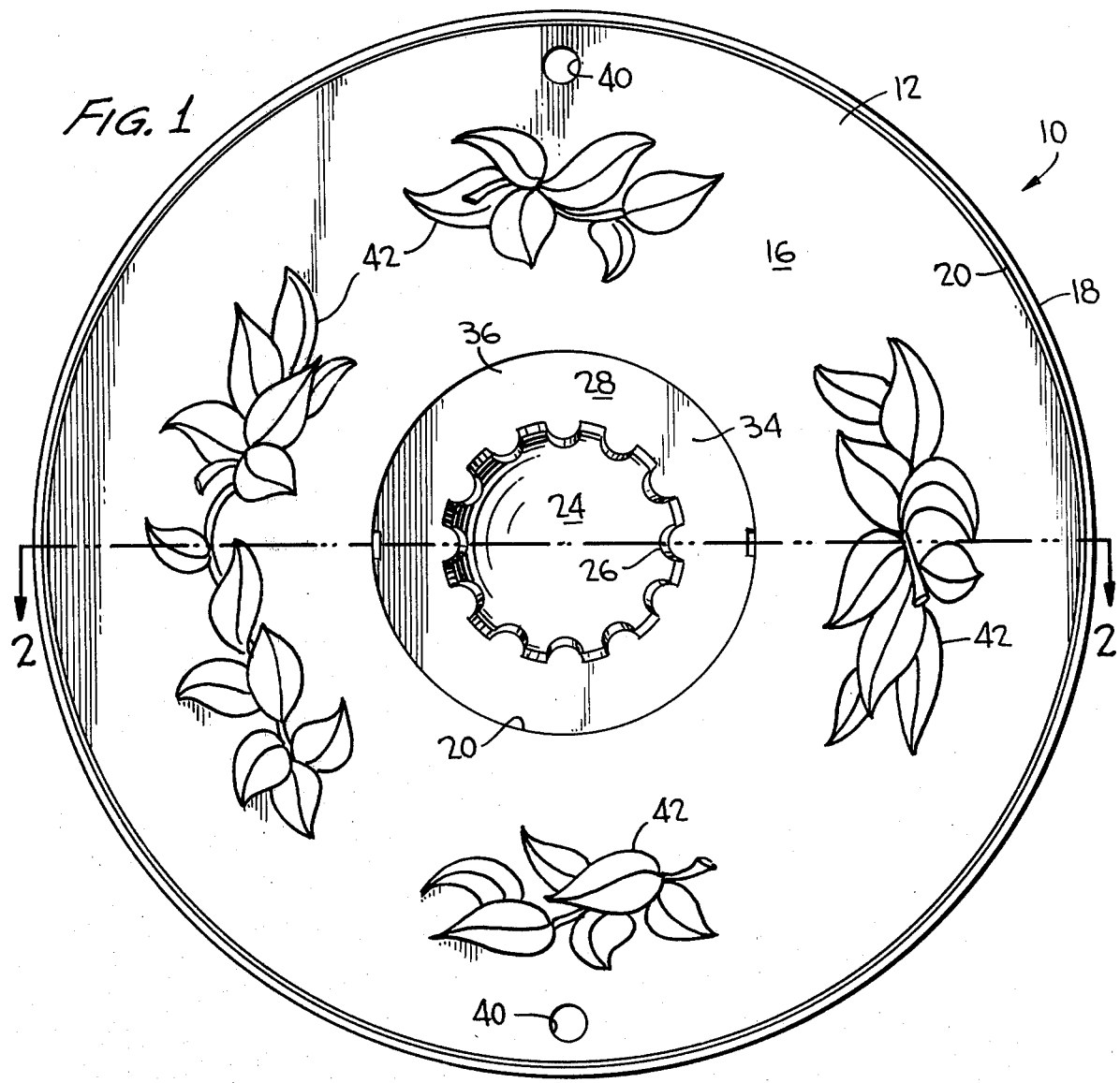

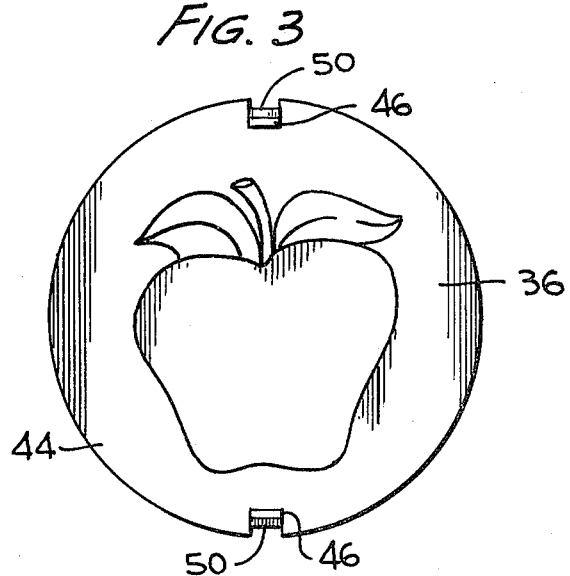
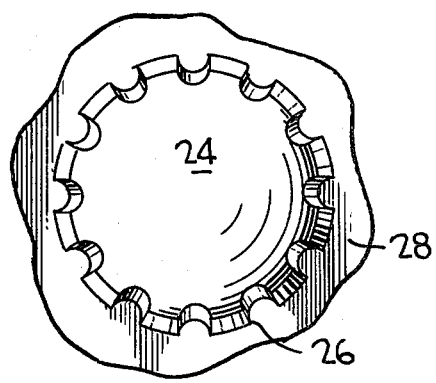
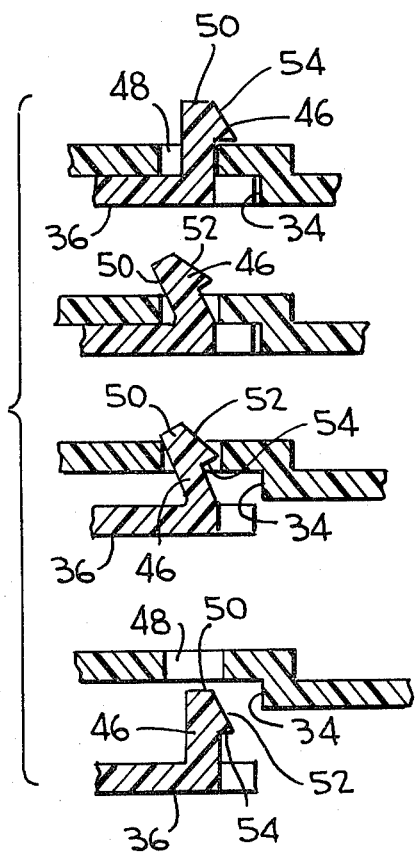

PIE CRUST CUTTING AND DECORATING APPARATUS

This is a continuation, of application Ser. No. 121,327 filed Feb. 14, 1980, now abandoned, which is a continuation-in-part application of Ser. No. 874,241 filed Feb. 1, 1978, now abandoned.

BACKGROUND OF THE INVENTION (1) Field of the Invention

The present invention generally relates to improvements in dough cuttters and, more particularly, appertains to a new and novel apparatus for cutting out a pie crust from a rolled out sheet of dough while simultaneously forming impressions therein which are to be filled in with a decorative food color filler after the crust is placed over the filling of a pie.

(2) State of the Art

Many devices are known in the art for cutting or stamping out varied shapes or forms of sections from pieces of dough. And some of such devices serve to form openings or depressions in the cutout sections.

For example, in U.S. Pat. No. 65,618, a device is disclosed which consists of an annular cutter having a top wall from which an integral die depends. The device is used for forming tarts with the die serving to form a deep cavity in the dough into which jelly is placed.

In U.S. Pat. No. 619,749, a biscuit or cookie cutter is disclosed which has an annular cutting wall with an attachment provided within the confines of the wall that terminates in a cutting edge and with the attachment having prongs on its lower end to form slits in the biscuit dough as it is stamped out by the cutting edge.

In U.S. Pat. No. 2,214,475, a dough cutter is disclosed that has a cutter member constituting an annular wall that terminates in a cutting edge. A mold plate is removably attached to the wall and covers the entire open area circumscribed by the wall at the cutting edge. In this way, a scalloped configuration is impressed into the entire dough section as it is stamped out from the rolled out dough sheet.

SUMMARY OF THE INVENTION

The present invention relates specifically to a novel apparatus for decoratively imprinting a substantially flat pie crust dough piece and simultaneously separating such piece in a desired geometrical shape from a rolled out pie crust dough.

A primary object of the present invention is to provide a single apparatus for cutting or stamping out the pie crust and to provide a plurality of die elements that can be removably carried by the apparatus for providing selected and varied decorative impressions in the pie crust dough piece.

Many persons prefer a pie to a cake and such persons would rather have a pie for party occasions, such as a birthday, instead of a cake. For such party occasions, a cake can be easily decorated and can have on the top of the frosting various sayings such as "happy birthday" or the like decoratively placed. However, for the persons, who prefer pies over cakes, it has not been possible to decorate the top crust of a filled pie, such as an apple, berry or the like pie.

Consequently, it is an important object of the present invention to provide an apparatus that not only stamps out the section for the top crust of a pie from a rolled out dough section but which simultaneously impresses in such stamped out section various and selective impressions which, after the pie crust is placed over the filling of the pie, can be filled in with suitable decorative food color fillers. Ancillary to such objective, the present invention provides removable die elements so that the top crust can be decorated with many and varied decorations and not be limited to a single decorative appearance.

Generally stated, the present invention comprises an annular flat rigid plate member having opposing upper and lower sides. A handle member projects upwardly from the center of the upper side and the lower side is adapted to be placed and held by the handle in facially confronting relation to a rolled out pie crust dough. The plate member is of a geometrical shape corresponding to the desired shape of the pie crust dough piece and is usually of an annular shape and has a peripheral edge. A cutting rim is made integral with the plate member and extends perpendicular to the lower side of the plate member and terminates in a cutting edge which serves to sever the pie crust dough piece from the rolled out dough when the plate member is moved by the handle bodily toward the dough piece while being held parallel to the dough piece.

Die elements are carried by the lower side of the plate member and are removably or otherwise affixed to the under side thereof and extend perpendicularly from the under side of the plate member inwardly of the cutting rim. The die elements are preferably changeable to form selected patterns and, therefore, are removable from the lower or underside of the plate member, being substantially coplanar and said outer ends lie in a plane substantially parallel with the cutting edge of the rim.

BRIEF DESCRIPTION OF THE DRAWINGS

FIG. 1 is a bottom plan view of the apparatus of the present invention.

FIG. 2 is a vertical cross-sectional view taken substantially on lines 2—2 of FIG. 1.

FIG. 3 is a bottom plan view of one of the removable die elements and is taken substantially on line 3—3 of FIG. 2.

FIG. 4 is a top plan view of the handle that projects upwardly from the plate member and is taken substantially on line 4—4 of FIG. 2.

FIG. 5 is a composite showing in detailed cross-section of the means for attaching the removable die element of FIG. 3 to the plate member with such die element being shown in detached relation to the plate member in FIG. 2.

DESCRIPTION OF THE PREFERRED EMBODIMENT

Referring now more particularly to the accompanying drawings, the pie crust cutting and decorating apparatus 10 includes a flat, thin plate member 12, which is formed from inexpensive but sturdy material, such as metal or plastics materials. The plate member 12 can be of any geometrical form but, usually as shown in FIG. 1, is annular in shape. The plate member has an upper side or face 14 and an under side or face 16. The plate member is formed on its peripheral edge 18 with a cutting rim 20 that depends perpendicularly from the under side or face 16 of the plate member and terminates in a sharp cutting edge, as shown in FIGS. 1 and 2.

The plate member is formed with a central opening 22 which is closed off by a handle member 24 that upstands from the upper side or face 14 of the plate member and which has a knurled or fluted side wall 26 whereby it can be easily grasped to afford an easy means for manually manipulating the plate member. The handle member 24 has an annular flange 28 formed on the lower edge of the knurled side wall 26 with the flange extending radially therefrom and closing off the opening 22. In this respect, the opening 22 is defined by a raised annular rim 30 integral with the plate member and the outer edge of the flange 28 abuts the rim and is suitably affixed thereto, as by adhesive or other suitable fastening means. In this fashion, the under side of the plate member is formed with a center counter bore 34 which is adapted to receive the supporting plate 36 for a removable or detachable center die element 38.

The plate member can be formed with vent ports 40, which are provided to vent the air as the plate member is moved downwardly toward a rolled out sheet of dough with the under side 16 of the plate member confronting the sheet of dough and the plate member being manipulated by grasping the handle member 24.

The under side 16 of the plate member is formed or provided, around the center counter bore 34 with decorative die elements 42 which, in the illustrated instance, are in the shape of flowers to complement the "apple" die element 44 formed integral with the detachable die element 38. The die element 44 depends from the under side of the plate 36 that is a part thereof and the plate 36 is adapted to fit within the counter bore 34 and close off the same, as can be appreciated from consideration of FIG. 2.

The plate or body 36 of the detachable die member 38 can be attached to the plate member 12 in many suitable ways. As shown in FIGS. 2 and 5, the member 36 is formed from a suitable, somewhat flexible plastic material and is provided with upstanding locking fingers 46 that are adapted to be inserted into locking openings 48 formed in the secured flange 28 of the handle member 24. Thus, as shown in sequence in FIG. 5, starting with the bottom and working toward the top of the cross-sectional detailed showings in FIG. 5, the plate or flat body 36 of the die member 38 is moved into the counter bore 34 and the locking fingers 46 tend to flex as they enter the openings 48. In this respect, the outer free ends 50 of the locking fingers are enlarged and have outer sloped or slanted faces 52 which act as cam surfaces to flex the fingers inwardly with the lower or under side of the slope face 52 terminating in a locking shoulder 54. Accordingly, the fingers, as the detachable die element 38 is moved into the counter bore 34 tend to flex inwardly as the cam surface rides over the bounding wall of the openings 48 until the enlarged end 50 is free of the openings at which point the fingers flex back to their normal perpendicular positions relative to the plate 36 of the removable die member which causes the shoulders 54 to lock on the upper surfaces of the flange 28 of the handle member, as shown in the top view of FIG. 5. In such position, the plate 36 is completely coplanar with the plate member 14 and the die element 44 is coplanar with the die elements 42. Thus, the die elements form depressions of the same depth in the dough section which is cut from the rolled out dough sheet by the cutting rim 18 as the body member is forced down onto the dough section by grasping the handle member 24.

The die element 44, while shown as representing an apple, can represent any fruit or the like and the flowers can be of any type. In addition, it is to be understood that the removable or detachable die element 38 can contain initials or names or sayings, such as "happy birthday" or the like. Also, the die elements 42, while shown as integral with the plate member 12, can be detachable therefrom and can be affixed in the structural manner of the die element 38. However, instead of the fingers and locking openings, as shown in FIGS. 2 and 5, the die element 38 and, of course, the die elements 42, can be removably attached to the rigid plate member by adhesives. The adhesives can be a compounded mixture containing a typical rubber base, tackifier, thickeners, plasticizer etc. to provide a pressure-sensitive composition or heat-sensitive composition. Typical rubber bases include natural and synthetic rubbers which are prepared by dissolving such rubbers in organic solvents or by emulsification in aqueous solutions. The solvent-type adhesives include natural rubber, chloroprene rubbers and the family of polymers referred to generically as "vinyl polymers," such as, vinyl chloride, vinylidene chloride, copolymers such as, vinyl chloride and vinyl acetate. Suitable latex-type or emulsion-type adhesives include natural rubber latices, vinyl acetate-type emulsion, crylic ester-type, etc. The latter are preferred.

Thus, it can be appreciated that the plate member carries on its under side any desired die elements which can be arranged in any desired pattern within the area defined by the cutting rim 18 and that the die elements can be removably secured to the under side of the plate member by mechanical attachment means, such as the locking fingers and openings, which can be formed in the plate member itself, or by adhesive or any other suitable means. This permits the plate member to be used with different die elements that will form different decorative impressions in the dough piece, as it is being stamped or cut from a rolled out dough section.

Of course, while the preferred form of the present invention has been described herein and shown in the drawings, it is to be understood, as discussed in the foregoing, that changes may be made therein, such as come within the spirit and scope of the appended claims.

What is claimed is:

1. An apparatus for forming decorative depressions in a substantially flat pie crust dough piece and simultaneously stamping such piece in a desired geometrical shape from a rolled out section of pie dough comprising:

a rigid plate member having opposing upper and lower faces;

said lower face being flat for placement in facially confronting relation to the rolled out section of pie dough;

said plate member being of a geometrical shape corresponding to the desired shape of the pie crust dough piece and having a peripheral edge;

a cutting rim integral with the plate member and extending perpendicular to the lower face of the plate member and depending therefrom and having a cutting edge remote from the lower face to sever the pie crust dough piece from the rolled out section of dough when the plate member is moved bodily toward the dough piece with the lower face parallel with the dough piece;

handle means carried by the plate member and projecting therefrom for manual manipulation of said plate member;

a plurality of die elements spaced inwardly from the peripheral surface of said cutting rim;

a substantially centrally mounted die element removably carried by the lower face of the plate member and having an inner and outer end with the outer end, when the substantially centrally mounted die element is affixed to the lower face of the plate member, being disposed closer to the lower face than the cutting edge on the cutting rim; and, means for detachably affixing the substantially centrally mounted die element to the plate member including a mounting plate to which the substantially centrally mounted die element is permanently affixed, said plate member having its lower face provided with a substantially centrally mounted counter bore in which the mounting plate fits, locking fingers being carried by the mounting plate and openings provided in the plate member for lockingly receiving said locking fingers said mounting plate having a lower face disposed coplanar with the lower face of the plate member when the mounting plate is locked in the plate member and with the substantially centrally mounted die element depending from the lower face of the mounting plate;

said locking fingers being flexible and extending upwardly from the mounting plate and having free locking ends adapted to be passed through the openings and locked behind the upper face of the plate member, said free ends of locking fingers being enlarged and including cam surfaces that ride over the bounding walls of the openings to flex the fingers which then snap back into perpendicular positions relative to the mounting plate for the substantially centrally mounted die element, said ends of the fingers having locking shoulders that engage the upper face of the plate member when the fingers are in locked placement so as to hold the mounting plate within the counter bore of the plate member;

said handle means being provided on said plate member above said substantially centrally mounted counter bore, said handle means projecting perpendicularly from the upper face of the plate member and having a lower end provided with a flange that closes off the substantially centrally mounted counter bore;

said plurality of die elements and said substantially centrally mounted die element forming depressions of the same depth in the pie crust dough as the handle means is depressed downwardly.

2. An apparatuus according to claim 1, wherein said substantially centrally mounted die element is shaped to represent a particular fruit.

3. An apparatus according to claim 1, wherein said substantially centrally mounted die element is shaped with a particular indica message.

4. An apparatus according to claim 1, wherein said plurality of die elements are shaped to represent flowers.

* * * * *